(12) United States Patent
Imai

(10) Patent No.: US 8,362,108 B2
(45) Date of Patent: Jan. 29, 2013

(54) TRANSFER INK JET RECORDING AQUEOUS INK

(75) Inventor: Takashi Imai, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 67 days.

(21) Appl. No.: 13/080,181

(22) Filed: Apr. 5, 2011

(65) Prior Publication Data

US 2011/0269885 A1    Nov. 3, 2011

(30) Foreign Application Priority Data

Apr. 28, 2010 (JP) ................................ 2010-102989

(51) Int. Cl.
*C09D 11/10* (2006.01)
(52) U.S. Cl. ......... 523/160; 524/366; 524/378; 524/558
(58) Field of Classification Search ................... 523/160; 524/558

See application file for complete search history.

(56) References Cited

U.S. PATENT DOCUMENTS

| | | | |
|---|---|---|---|
| 6,743,284 B2 * | 6/2004 | Norimatsu et al. | 106/31.58 |
| 6,935,732 B2 | 8/2005 | Takada et al. | |
| 7,276,112 B2 | 10/2007 | Tokuda et al. | |
| 7,377,631 B2 | 5/2008 | Takada et al. | |
| 7,402,200 B2 | 7/2008 | Imai et al. | |
| 7,635,182 B2 | 12/2009 | Hakamada et al. | |
| 7,883,199 B2 | 2/2011 | Hakamada et al. | |
| 7,909,448 B2 | 3/2011 | Iwata et al. | |
| 7,947,762 B2 | 5/2011 | Udagawa et al. | |
| 2007/0097155 A1 | 5/2007 | Imai et al. | |
| 2007/0097156 A1* | 5/2007 | Udagawa et al. | 347/1 |
| 2007/0112095 A1 | 5/2007 | Moribe et al. | |
| 2010/0075046 A1 | 3/2010 | Hakamada et al. | |

FOREIGN PATENT DOCUMENTS

JP    2007-146128 A    6/2007

* cited by examiner

*Primary Examiner* — Vu A Nguyen

(74) *Attorney, Agent, or Firm* — Fitzpatrick, Cella, Harper & Scinto

(57) ABSTRACT

An aqueous ink for a transfer ink jet recording method including applying to an intermediate transfer member a reaction liquid which forms an increased viscosity ink image by coming into contact with a coloring material in the ink, applying the ink to the intermediate transfer member by an ink jet device to form an intermediate image, and bringing a printing object into contact with the intermediate transfer member to transfer the image to the object. The aqueous ink contains a coloring material which is a polymer dispersion pigment dispersed in the aqueous medium with a polymer having a hydroxyl group in its structure as a dispersant, a nonionic surfactant which is an alcohol ether surfactant a 1% aqueous solution of which has a cloud point of 33° C. or less and which has a $C_4$-$C_{30}$ alkyl group and a propyleneoxy group in its structure, and an aqueous medium.

4 Claims, No Drawings

TRANSFER INK JET RECORDING AQUEOUS INK

BACKGROUND OF THE INVENTION

1. Field of the Invention

The present invention relates to an aqueous ink used in transfer ink jet recording.

2. Description of the Related Art

As a printing system, is known a recording method in which an ink is ejected on an intermediate transfer member to which a reaction liquid has been applied by an ink jet recording method to form an intermediate image, and then the formed intermediate image is transferred to a recording medium to form a final image (transfer ink jet recording method). This method enables high image definition and speeding up of recording. In addition, the light fastness, water fastness and gas fastness of an image to be formed are improved by using a pigment ink.

On the other hand, when a pigment ink is used, it is known that ejection stability is improved by using a polymer having a hydroxyl group in at least a part of its structure as a dispersant (see Japanese Patent Application Laid-Open No. 2007-146128).

However, the present inventors have carried out a detailed investigation and found a problem that when a pigment ink containing, as a dispersant, such a polymer having a hydroxyl group in at least a part thereof as described above is used in a transfer recording method, deterioration of image quality may be caused in some cases due to transfer leftovers on an intermediate transfer member.

SUMMARY OF THE INVENTION

Accordingly, it is an object of the present invention to provide a transfer ink jet recording aqueous ink, which can inhibit the problem of the deterioration of image quality due to the transfer leftover and is excellent in ejection stability when the ink is applied to a transfer ink jet recording method.

The present inventors have carried out an extensive investigation repeatedly with a view toward solving such problem of the prior art as described above found in the course of the investigation. As a result, the present invention has been led to completion. More specifically, the present invention provides an aqueous ink used in a transfer ink jet recording method comprising an intermediate image forming step of applying an ink containing a coloring material component to an intermediate transfer member to which a reaction liquid which forms an increased viscosity ink image by coming into contact with the coloring material component in the ink has been applied, by means of an ink jet device to form an intermediate image, and a transfer step of bringing a printing object into contact under pressure with the intermediate transfer member on which the intermediate image has been formed to transfer the intermediate image to the printing object, wherein the ink contains a polymer dispersion pigment dispersed in an aqueous medium with a polymer having a hydroxyl group in at least a part of its structure as a dispersant, and a nonionic surfactant, and the surfactant is an alcohol ether surfactant a 1% aqueous solution of which has a cloud point of 33° C. or less and which has an alkyl group having 4 to 30 carbon atoms and a propyleneoxy group in its structure.

According to the present invention, a transfer ink jet recording aqueous ink which can inhibit the problem of the deterioration of image quality due to the transfer leftover and is excellent in ejection stability when the ink is applied to a transfer ink jet recording method is provided.

Further features of the present invention will become apparent from the following description of exemplary embodiments.

DESCRIPTION OF THE EMBODIMENTS

Preferred embodiments of the present invention will now be described in detail. The present inventors have pursued the cause of the transfer leftover which is a problem solved by the present invention, and consequently come to the conclusion that the following phenomenon which takes place on the intermediate transfer member is a cause. In short, when the polymer used as the dispersant for the pigment is aggregated or insolubilized by the reaction liquid or by drying or concentration, the transfer leftover on the transfer member becomes hard to occur. However, it is considered that when the polymer has a hydroxyl group in its structure, the aggregation by the reaction liquid or by drying or concentration becomes hard to occur, and a hydrophobic portion of the polymer may be adsorbed on the transfer member in some cases to cause the transfer leftover.

Thus, the present inventors have carried out a further investigation with a view toward inhibiting the above phenomenon and found that when an alcohol ether surfactant having strong hydrophobicity (low cloud point) and a propyleneoxy group is mixed into the ink, such an ink becomes excellent in ejection stability and can also inhibit the transfer leftover when the ink is applied to an transfer ink jet recording system.

The present inventors consider the reason why the problem of the present invention can be solved by providing an ink having such constitution and using the ink in transfer ink jet recording to be as follows. First, such a state that a hydrophobic portion of the surfactant has been adsorbed on a hydrophobic portion of the polymer is created in the ink by a hydrophobic interaction between the dispersant polymer and the surfactant. An interaction between the transfer member and the polymer is thus inhibited, whereby the adsorption of the polymer on the transfer member is inhibited, and consequently the occurrence of transfer leftovers is inhibited.

In short, the effect brought about by the present invention can be realized by paying attention to the adsorption of the polymer on the transfer member and utilizing the hydrophobic interaction between the polymer and the surfactant. The respective components making up the ink according to the present invention will now be described.

Surfactant

The nonionic surfactant characterizing the aqueous ink according to the present invention is required to be an alcohol ether surfactant a 1% aqueous solution of which has a cloud point of 33° C. or less and which has an alkyl group having 4 to 30 carbon atoms and a propyleneoxy group (hereinafter abbreviated as PO group) represented by —($CH_2CH_2CH_2O$)—. In the present invention, the surfactant a 1% aqueous solution of which has a cloud point of 33° C. or less means a surfactant whose cloud point is 33° C. or less when the cloud point of an aqueous solution containing 1% by mass of the surfactant is measured. Since a surfactant a 1% aqueous solution of which has a cloud point exceeding 33° C. is low in its hydrophobicity, an interaction to a hydrophobic portion in the polymer structure is low, and so the effect of the present invention cannot be sufficiently achieved. The term "cloud point" as used herein means a temperature at a boundary of a phase transition, i.e., a point of temperature at which an aqueous solution of the surfactant becomes clouded due to rapid lowering its solubility at a certain temperature when the aqueous solution is heated. This cloud point is optimum as an index indicating the hydrophilicity and hydrophobicity of surfactants in general, and the hydrophobicity of a surfactant may be said to be high as its cloud point is low. The reason why the effect of the present invention is achieved when the alcohol ether surfactant having the PO group is caused to be contained is not clearly known. However, it is inferred that the surfactant has 2 hydrophobic portions of the PO group and alkyl group, whereby an interaction to the hydrophobic portion in the polymer is sufficiently achieved. In the present invention, the alkyl group of the surfactant is favorably an alkyl group having 7 to 24 carbon atoms. The nonionic surfactant favorably has the PO group and an ethyleneoxy group represented by —(CH$_2$CH$_2$O)—. Specifically, in the present invention, the nonionic surfactant is favorably a compound having a structure represented by the following formula (1).

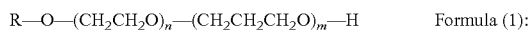

R—O—(CH$_2$CH$_2$O)$_n$—(CH$_2$CH$_2$CH$_2$O)$_m$—H    Formula (1):

(In the formula (1), R is an alkyl group having 7 to 24 carbon atoms, n is 2 to 50, and m is 1 to 20.)

As for the content of the nonionic surfactant, the mass ratio of the content of the polymer having the hydroxyl group in at least a part thereof to the content of this surfactant (polymer/surfactant) is favorably 0.1 or more and less than 10. If the mass ratio is 10 or more, the amount of the surfactant is relatively too small compared with the polymer, and so the interaction to the polymer may not be sufficiently achieved in some cases. Such a high mass ratio is hence not favorable.

Specific examples of commercially available surfactants that can be mentioned as examples of the surfactant making up the ink according to the present invention include FINE-SURF: 7085 and 7045 and ELP-0809B (products of AOKI OIL INDUSTRIAL CO., LTD.), SOFTANOL EP: 5035 and 7045 (products of NIPPON SHOKUBAI CO., LTD.) and EMALEX DAPE0205 (product of Nihon Emulsion Co., Ltd.). These commercially available surfactants are favorable because the formula (1) is satisfied.

Polymer Having a Hydroxyl Group in at Least a Part Thereof (Dispersant)

Examples of the polymer having a hydroxyl group in at least a part thereof (hereinafter also referred to as a polymer dispersant) include acrylic ester polymers obtained by copolymerizing an acrylic ester monomer and a hydroxyl-group-containing acrylic ester monomer. As the hydroxyl-group-containing monomer, may be used 2-hydroxyethyl(meth)acrylate, hydroxypropyl(meth)acrylate, polyethylene glycol mono(meth)acrylate or polypropylene glycol mono(meth)acrylate. As the acrylic ester monomer to be copolymerized with the hydroxyl-group-containing monomer, may be used a general-purpose acrylic ester monomer. Examples thereof include methyl(meth)acrylate, ethyl(meth)acrylate, n-butyl (meth)acrylate, 2-ethylhexyl(meth)acrylate and cyclohexyl (meth)acrylate. Besides the acrylic ester monomers, a monomer having a double bond copolymerizable with these monomers may also be used. For example, monomers having at least one double bond such as styrene monomers, vinyl acetate monomers and 1,3-butadiene may be used.

Another example of the polymer dispersant includes polymers obtained by saponifying a vinyl acetate-acrylic ester copolymer obtained by copolymerizing an acrylic ester monomer and a vinyl acetate monomer.

Incidentally, no particular limitation is imposed on the structure of the polymer having a hydroxyl group in at least a part thereof (polymer dispersant), and the structure may be any of linear, branched, random copolymerization and block copolymerization forms. However, in the case of a polymer obtained by copolymerizing a segment having a hydroxyl group in at least a part thereof and a segment having no hydroxyl group, the polymer is favorably a block copolymer, more favorably a block copolymer in which the monomer having the hydroxyl group is present at an end of the polymer.

The acid value of the polymer dispersant used in the present invention is favorably 50 mg KOH/g or more and less than 350 mg KOH/g, more favorably 80 mg KOH/g or more and less than 250 mg KOH/g. An acid value less than 50 mg KOH/g is not favorable because the ink jet ejection stability of the resulting ink becomes insufficient. On the other hand, an acid value of 350 mg KOH/g or more is not favorable because the storage stability of the resulting ink becomes insufficient. Incidentally, the acid value of the polymer can be determined by potentiometric titration.

The molecular weight of the polymer dispersant used in the present invention is favorably within a range of 1,000 or more and 30,000 or less, more favorably 3,000 or more and 15,000 or less, in terms of weight-average molecular weight Mw. Measurements of the weight-average molecular weight Mw, number average molecular weight Mn and polydispersity Mw/Mn of the polymer can be determined by a size exclusion chromatographic (gel permeation chromatographic) method (hereinafter abbreviated as GPC method). The polydispersity (a ratio Mw/Mn of the weight-average molecular weight Mw to the number average molecular weight Mn) is favorably 1.0 or more and 3.0 or less. KOH is used for neutralization of the polymer, and the neutralization is favorably conducted with a quantity of 0.8 equivalents or more and 1.2 equivalents or less based on the acid value actually measured. In the present invention, such a polymer having a hydroxyl group in at least a part thereof as described above is used as the dispersant for the pigment. However, no particular limitation is imposed on the content of the polymer in the ink so far as ejection stability is achieved. For example, the polymer dispersant is favorably used within a range of 10 parts by mass or more and 100 parts by mass or less per 100 parts by mass of the pigment.

Aqueous Medium

In order to stably use the ink according to the present invention in an ink jet system, an aqueous medium such as water or a mixed solvent of water and a water-soluble organic solvent is contained in the ink. The viscosity and surface tension of the ink are favorably adjusted to respective desired values with a water-soluble organic solvent so as to have excellent ink jet election properties.

The water-soluble organic solvents used in the aqueous ink according to the present invention may be selected from the following solvents. Specific examples thereof include alkyl alcohols having 1 to 4 carbon atoms, such as methyl alcohol, ethyl alcohol, n-propyl alcohol, isopropyl alcohol, n-butyl alcohol, sec-butyl alcohol and tert-butyl alcohol; amides such as dimethylformamide and dimethylacetamide; ketones and ketone alcohols such as acetone and diacetone alcohol; ethers such as tetrahydrofuran and dioxane; polyalkylene glycols such as polyethylene glycol and polypropylene glycol; alkylene glycols the alkylene group of which has 2 to 6 carbon atoms, such as ethylene glycol, propylene glycol, butylene glycol, triethylene glycol, thiodiglycol, hexylene glycol and diethylene glycol; lower alkyl ether acetates such as polyethylene glycol monomethyl ether acetate; 1,2,6-hexanetriol; glycerol; lower alkyl ethers of polyhydric alcohols, such as ethylene glycol monomethyl (or monoethyl)ether, diethylene glycol methyl (or ethyl)ether and triethylene glycol monomethyl (or monoethyl)ether; N-methyl-2-pyrrolidone; 2-pyrrolidone; and 1,3-dimethyl-2-imidazolidinone. As the water, is desirably used deionized water.

No particular limitation is imposed on the content of the water-soluble organic solvents in the aqueous ink according to the present invention. However, the content is favorably within a range of 3% by mass or more and 50% by mass or less based on the total mass of the ink. The amount of water contained in the ink is favorably within a range of 50% by mass or more and 95% by mass or less based on the total mass of the ink.

Pigment

The coloring material making up the aqueous ink according to the present invention may be any pigment so far as it can be used in the aqueous ink. However, the pigment is required to be a polymer dispersion pigment dispersed in the aqueous medium by the polymer dispersant having the specific structure described previously. The proportion of the coloring material to the total mass of the ink is favorably 0.1% by mass or more and 15.0% by mass or less, more favorably 0.5% by mass or more and 10.0% by mass or less. The pigments usable in the present invention will hereinafter be described.

Carbon black is favorable as a pigment used in a black ink. Any carbon black of, for example, furnace black, lamp black, acetylene black and channel black may be used. Specific examples of pigments usable include commercially available products such as Raven: 7000, 5750, 5250, 5000 ULTRA, 3500, 2000, 1500, 1250, 1200, 1190 ULTRA-II, 1170 and 1255 (all, products of Columbian Carbon Co.); Black Pearls L, Regal: 400R, 330R and 660R, Mogul L, Monarch: 700, 800, 880, 900, 1000, 1100, 1300, 1400 and 2000, and Valcan XC-72R (all, products of Cabot Co.); Color Black: FW1, FW2, FW2V, FW18, FW200, S150, S160 and S170, Printex: 35, U, V, 140U and 140V, and Special Black: 6, 5, 4A and 4 (all, products of Degussa AG); and No. 25, No. 33, No. 40, No. 47, No. 52, No. 900, No. 2300, MCF-88, MA600, MA7, MA8 and MA100 (all, products of MITSUBISHI CHEMICAL CORPORATION). Carbon black newly prepared for the present invention may also be used. However, the carbon black pigments in the present invention are not limited thereto, and any carbon black conventionally known may be used. Magnetic fine particles such as magnetite and ferrite as well as titanium black may also be used as black pigments without being limited to the carbon black pigments.

Specific examples of organic pigments include the following pigments: insoluble azo pigments such as Toluidine Red, Toluidine Maroon, Hansa Yellow, Benzidine Yellow and Pyrazolone Red; soluble azo pigments such as Lithol Red, Helio Bordeaux, Pigment Scarlet and Permanent Red 2B; derivatives from vat dyes such as alizarin, indanthron and Thioindigo Maroon; phthalocyanine pigments such as Phthalocyanine Blue and Phthalocyanine Green; quinacridone pigments such as Quinacridone Red and Quinacridone Magenta; perylene pigments such as Perylene Red and Perylene Scarlet; isoindolinone pigments such as Isoindolinone Yellow and Isoindolinone Orange; imidazolone pigments such as Benzimidazolone Yellow, Benzimidazolone Orange and Benzimidazolone Red; pyranthrone pigments such as Pyranthrone Red and Pyranthrone Orange; indigo pigments; condensed azo pigments; thioindigo pigments; diketopyrrolopyrrole pigments, and other pigments such as Flavanthrone Yellow, Acylamide Yellow, Quinophthalone Yellow, Nickel Azo Yellow, Copper Azomethine Yellow, Perinone Orange, Anthrone Orange, Dianthraquinonyl Red and Dioxazine Violet. Quite naturally, the organic pigments are not limited thereto, and other organic pigment may be used.

When organic pigments usable in the present invention are indicated by COLOR INDEX (C.I.) numbers, the following pigments may be exemplified. C.I. Pigment Yellow: 12, 13, 14, 17, 20, 24, 74, 83, 86, 93, 97, 109, 110, 117, 120, 125, 128, 137, 138, 147, 148, 150, 151, 153, 154, 166, 168, 180 and 185; C.I. Pigment Orange: 16, 36, 43, 51, 55, 59, 61 and 71; C.I. Pigment Red: 9, 48, 49, 52, 53, 57, 97, 122, 123, 149, 168, 175, 176, 177, 180, 192, 215, 216, 217, 220, 223, 224, 226, 227, 228, 238, 240, 254, 255 and 272; C.I. Pigment Violet: 19, 23, 29, 30, 37, 40 and 50; C.I. Pigment Blue: 15, 15:1, 15:3, 15:4, 15:6, 22, 60 and 64; C.I. Pigment Green: 7 and 36; and C.I. Pigment Brown: 23, 25 and 26.

It is necessary to use the polymer having a hydroxyl group in at least a part thereof as described above as a dispersant for dispersing the pigment in the ink in view of ejection properties. In addition, another polymer having no hydroxyl group may be used as a dispersant in combination. In case of the combined use, the content of another polymer having no hydroxyl group in the ink is favorably 50% by mass or less based on the total mass of the polymer having a hydroxyl group in at least a part thereof in the ink. Any polymer may be used as another dispersant so far as such a polymer is a water-soluble polymer. However, a polymer having a weight-average molecular weight within a range of 1,000 or more and 30,000 or less is favorable, and a polymer having a weight-average molecular weight within a range of 3,000 or more and 15,000 or less is more favorable. Such a dispersant is favorably a copolymer composed of a hydrophobic monomer and a hydrophilic monomer. Examples of the hydrophobic monomer used in this case include styrene, styrene derivatives, vinylnaphthalene, vinylnaphthalene derivatives and aliphatic alcohol esters of $\alpha,\beta$-ethylenically unsaturated carboxylic acids. Examples of the hydrophilic monomer include acrylic acid, acrylic acid derivatives, maleic acid, maleic acid derivatives, itaconic acid, itaconic acid derivatives, fumaric acid, fumaric acid derivatives, vinyl acetate, vinylpyrrolidone, and acrylamide and derivatives thereof. A block copolymer, a random copolymer or a graft copolymer formed from at least 2 monomers (at least one thereof is a hydrophilic monomer) selected from these monomers or a salt thereof may be used. Natural resins such as rosin, shellac and starch may also be favorably used without being limited to the above-mentioned resins. These resins are soluble in an aqueous solution with an alkali dissolved therein and are alkali-soluble polymers.

Other Components

In addition to the above-described components, moisture-retaining solids such as urea, urea derivatives, trimethylolpropane and trimethylolethane may be used as an ink component in the aqueous ink according to the present invention for the purpose of maintaining the moisture retention of the ink. The content of the moisture-retaining solids such as urea, urea derivatives and trimethylolpropane in the ink is favorably within a range of generally 0.1% by mass or more and 20.0% by mass or less, more preferably 3.0% by mass or more and 10.0% by mass or less, based on the mass of the ink.

In addition to the above-described components, various additives such as a pH adjuster, a rust preventive, a preservative, a mildewproofing agent, an antioxidant, an anti-reducing agent and an evaporation accelerator may be contained in the aqueous ink according to the present invention as needed.

The aqueous ink according to the present invention is used in a transfer ink jet recording method. The method uses an intermediate transfer member to which a reaction liquid which forms an increased viscosity ink image by coming into contact with the coloring material component in the ink is previously applied to thereafter form an intermediate image with the aqueous ink according to the present invention thereafter. The outlines of this printing method will now be described. In this printing method, an intermediate image is formed on the intermediate transfer member with the aqueous ink according to the present invention by means of an ink jet device, and a printing object is brought into contact under pressure with the intermediate transfer member on which the intermediate image has been formed to transfer the intermediate image to the printing object, thereby obtaining an image print. The outlines thereof will hereinafter be described by a printing method according to an embodiment.

Intermediate Transfer Member

The intermediate transfer member characterizing the above printing method is first described. In the present invention, a reaction liquid which forms an increased viscosity ink image by coming into contact with the coloring material component contained in the ink according to the present invention is applied to the surface of the intermediate transfer member, and the aqueous ink according to the present invention is then applied to form an intermediate image. In the following, the step of applying the reaction liquid is also referred to as a reaction liquid applying step, and the step of forming an intermediate image with the aqueous ink is also referred as an intermediate image forming step. In short, the intermediate transfer member in the present invention is a base material for holding the reaction liquid and the ink to form an intermediate image. The construction (structure) of the intermediate transfer member is formed of a supporting member for handling of the intermediate transfer member and transmission of necessary force and a surface member on which an image is formed. These members may be formed from uniform members or from a plurality of members independent of each other. Examples of the form of the members include a sheet form, a roller form, a drum form, a belt form and an endless web form. The size of the intermediate transfer member may be freely selected according to the intended size of a printed image.

The supporting member of the intermediate transfer member is required to have a certain structural strength from the viewpoints of conveyance accuracy and durability. As a material thereof, a metal, ceramic or polymer is favorable. As the performance required of the material, reduction of inertia upon operation to improve responsiveness to control is mentioned in addition to stiffness capable of withstanding a pressure upon transfer to the printing object and dimensional accuracy. From these required properties, for example, aluminum, iron, stainless steel, an acetal polymer, an epoxy polymer, polyimide, polyethylene, polyethylene terephthalate, nylon, polyurethane, silica ceramic or alumina ceramic is extremely favorably used. These materials may be favorably used in combination.

The surface member of the intermediate transfer member desirably has a certain elasticity because a printing object such as paper is brought into contact under pressure with the surface member to transfer the image. For example, when paper is used as the printing object, the hardness of the surface member is within a range of favorably 10° or more and 100° or less, more favorably 20° or more and 60° or less, in terms of Durometer Type A hardness (according to JIS K 6253).

As a material of the surface member, may be used any of various materials such as polymers and ceramics. However, various elastomer materials and such rubber materials as described below are favorably used from the viewpoints of the above-described properties and processing properties. Examples thereof include fluorosilicone rubber, phenylsilicone rubber, fluororubber, chloroprene rubber, nitrile rubber, ethylene propylene rubber, natural rubbers, styrene rubber, isoprene rubber, butadiene rubber, ethylene/propylene/butadiene terpolymers and nitrile butadiene rubber. Among these, silicone rubber, fluorosilicone rubber, phenylsilicone rubber, fluororubber and chloroprene rubber may be extremely favorably used from the viewpoints of dimensional stability, durability and heat resistance. The surface member may also be favorably formed by laminating a plurality of materials. For example, a laminated material with a polyurethane belt thinly coated with silicone rubber may be extremely favorably used.

The surface member may be used after subjected to a proper surface treatment. Examples of the surface treatment include flame treatment, corona treatment, plasma treatment, polishing treatment, roughening treatment, treatment by irradiation of active energy rays (UV, IR or RF), ozone treatment and surfactant treatment. These treatments may be conducted in any combination thereof. Needless to say, any of various adhesive materials and double coated tapes may be present between the surface member and the supporting member for fixing and holding these members.

Reaction Liquid

The reaction liquid applied to the intermediate transfer member of such a construction as described above prior to the application of the ink may be any liquid so far as an increased viscosity ink image can be formed when coming into contact with the coloring material component in the ink according to the present invention and contains at least an ink viscosity increasing component. The ink viscosity increase means not only the case where increase in the viscosity of the whole ink composition by contact of the ink with the ink viscosity increasing component is observed, but also the case where a local viscosity increase by aggregation of a part of the ink composition such as the coloring material is caused. The ink composition is hereinafter referred to as an ink merely.

This ink viscosity increasing component lowers the flowability of the ink and/or a part of the ink on the intermediate transfer member, whereby bleeding that inks applied adjacently to each other intermix and beading that an ink impacted previously is attracted by an ink impacted later can be inhibited. No particular limitation is imposed on the ink viscosity increasing component used in the present invention, and metal ions and polymeric flocculants are mentioned. However, a substance causing a change in pH of an ink to aggregate a pigment in the ink is favorable, and an organic acid is more favorable.

Examples of the organic acid include oxalic acid, polyacrylic acid, formic acid, acetic acid, propionic acid, glycolic acid, malonic acid, malic acid, maleic acid, ascorbic acid, succinic acid, glutaric acid, glutamic acid, fumaric acid, citric acid, tartaric acid, lactic acid, pyrrolidonecarboxylic acid, pyrronecarboxylic acid, pyrrolecarboxylic acid, furancarboxylic acid, pyridine-carboxylic acid, coumalic acid, thiophenecarboxylic acid, nicotinic acid, oxysuccinic acid and dioxysuccinic acid. Since an organic acid itself may be used as the reaction liquid, the content of the organic acid contained in the reaction liquid may be regarded as 100% by mass based on the total mass of the reaction liquid. No particular limitation is imposed on the lower limit of the content of the reaction liquid. However, 5% by mass or more is favorable.

Various polymers may also be added to the reaction liquid for improving transferability upon transfer of the intermediate image by bringing it into contact under pressure with the printing object such as paper or improving the fastness properties of an image finally formed. Such a polymer is added to the reaction liquid, whereby it is possible to obtain good adhesion property of the intermediate image to the printing object upon transfer or improve the mechanical strength of an ink film. It is also expected to improve the water fastness of the image according to the kind of the polymer. No limitation is imposed on the materials used for such purposes so far as they can coexist with the ink viscosity increasing component. For example, polyvinyl alcohol and polyvinylpyrrolidone are favorably used. A polymer which is crosslinked by a reaction with a component contained in the ink is also favorable. Examples thereof include oxazoline and carbodiimide which are crosslinked by a reaction with a carboxylic acid frequently used for dispersion of the coloring material in the ink. These polymers may be dissolved in the solvent of the reaction liquid or added in a state of an emulsion or suspension. The reaction liquid may be used by suitably adjusting its surface tension by addition of a surfactant.

Application of Reaction Liquid to Intermediate Transfer Member

As a method for applying the reaction liquid containing such components as described above to the intermediate transfer member, may be suitably used various methods heretofore known. Examples thereof include die coating, blade coating, gravure roller coating and combinations of an offset roller with these coating methods. Use of an ink jet device is extremely favorable as a method capable of applying the reaction liquid at a high speed with high accuracy. Incidentally, the reaction liquid may be applied to at least an ink image forming portion of the intermediate transfer member and the vicinity thereof.

Imaging

The ink is then applied by means of an ink jet device to the intermediate transfer member to which the reaction liquid has been applied, and no particular limitation is imposed on the form of the whole ink jet device. For example, an ink jet head of a line head form in which ink ejection openings are arranged in a moving direction (in case of a drum form, axial direction) of the intermediate transfer member, or a head of a shuttle form in which recording is conducted while scanning the head perpendicularly to the moving direction of the intermediate transfer member may be used. When the ink is applied to the intermediate transfer member, an ink image is formed as an intermediate image. Incidentally, quite naturally, an image (mirror image) reverse to a desired image is formed on the intermediate transfer member upon the formation of the intermediate image.

Removal of Water

In the printing method using the aqueous ink according to the present invention, a step of reducing a liquid component from the intermediate image formed above is also favorably provided. In short, if the liquid component of the intermediate image is excessive, an excess liquid is pushed out or overflowed in the next pressure contact and transfer step, and so the image is messed, or transfer failure is caused. Incidentally, as a method for the removal of water, may be suitably applied any method of conventionally used various methods. For example, a method by heating, a method of supplying low-humidity air, a method of reducing a pressure, a method of bringing an absorbent into contact with the intermediate image, or a combination thereof is suitably used. Air drying may also be used.

Transfer

Thereafter, the printing object is brought into contact under pressure with the intermediate image to transfer the image to the printing object from the intermediate transfer member, thereby obtaining an image print. In the present specification, "printing object" means not only paper used in general printing, but also a wide variety of printing media and recording media such as fabrics, plastics and films. At this time, pressure rollers are favorably used to apply a pressure from both sides of the intermediate transfer member and the printing object because an image is efficiently transferred and formed. Multi-stage pressurization is also favorable because it is effective for reduction in transfer failure.

Cleaning

Although the formation of an image is completed by the above-described process, the intermediate transfer member used above may be used repeatedly and continuously from the viewpoint of productivity. At that time, the surface of the intermediate transfer member is favorably cleaned and reproduced before the next image formation. In this case, as a method for cleaning and reproducing the intermediate transfer member, may be suitably applied any of conventionally used various methods. Any of a method of applying a washing liquid in a shower, a method of bringing a wetted molleton roller into contact with the surface for rubbing-off, a method of bring the surface into contact with the liquid surface of a cleaning liquid and a method of performing rubbing-off by a wiper blade and a method of applying various kinds of energy is favorable. Quite naturally, a method of combining plural methods among these methods is also favorable.

Fixing

As an additional step, the printing object on which the image has been recorded after the transfer may be pressed by a roller to improve the surface smoothness thereof. At this time, when the roller has been heated in advance, the fastness properties of the image may be improved in some cases, and so this step is also favorable.

The present invention will hereinafter be described more specifically by Examples and Comparative Examples. The present invention is not limited by the following Examples unless going beyond the gist of the present invention. Incidentally, "parts" or "part" and "%" in the sentences are based on the mass unless expressly noted. The term "balance (Bal)" means remaining parts when the total of the respective components is regarded as 100 parts.

Preparation of Black Pigment Dispersion 1

As a polymer having a hydroxyl group in at least a part thereof obtained by using a hydroxyl-group-containing monomer, was used the following block copolymer, and Polymer A obtained by saponifying and neutralizing this copolymer with an aqueous solution of potassium hydroxide was used. Polymer A is an aqueous solution having a solid content of 20% obtained by saponifying and neutralizing poly(2-hydroxyethyl acrylate)-b-poly(styrene-co-acrylic acid) [compositional ratio 20:60:20 (molar ratio), acid value 110 mg KOH/g, weight-average molecular weight 8,000] with the aqueous solution of potassium hydroxide. Twenty parts of this Polymer A, 10 parts of a pigment [carbon black (trade name: Monarch 1100, product of Cabot Co.)] and 70 parts of ion-exchanged water were mixed and dispersed for 3 hours by means of a batch type vertical sand mill. Thereafter, coarse particles were removed by a centrifugal treatment, and the thus treated dispersion was filtered under pressure through a microfilter (product of Fuji Photo Film Co., Ltd.) having a pore size of 3.0 µm to obtain Black Pigment Dispersion 1 having a pigment concentration of 10%.

Preparation of Black Pigment Dispersion 2

As a polymer having a hydroxyl group in at least a part thereof obtained by using a hydroxyl-group-containing monomer and, was used the following block copolymer different in composition from Polymer A, and Polymer B obtained by saponifying and neutralizing this copolymer with an aqueous solution of potassium hydroxide was used. Polymer B is an aqueous solution having a solid content of 20% obtained by saponifying and neutralizing poly(2-hydroxyethyl acrylate)-b-poly(styrene-co-acrylic acid) [compositional ratio 20:45:35 (molar ratio), acid value 210 mg KOH/g, weight-average molecular weight 7,000] with the aqueous solution of potassium hydroxide. Twenty parts of this Polymer B, 10 parts of a pigment [carbon black (trade name: Monarch 1100, product of Cabot Co.)] and 70 parts of ion-exchanged water were mixed and dispersed for 3 hours by means of a batch type vertical sand mill. Thereafter, coarse particles were removed by a centrifugal treatment, and the thus treated dispersion was filtered under pressure through a microfilter (product of Fuji Photo Film Co., Ltd.) having a pore size of 3.0 μm to obtain Black Pigment Dispersion 2 having a pigment concentration of 10%.

Preparation of Cyan Pigment Dispersion

As a polymer having a hydroxyl group in at least a part thereof obtained by using a hydroxyl-group-containing monomer, was used the following block copolymer different in composition from Polymer A, and Polymer C obtained by saponifying and neutralizing this copolymer with an aqueous solution of potassium hydroxide was used. Polymer C is an aqueous solution having a solid content of 20% obtained by saponifying and neutralizing poly(2-hydroxyethyl acrylate)-b-poly(styrene-co-acrylic acid) [acid value 140 mg KOH/g, compositional ratio 20:55:25 (molar ratio), weight-average molecular weight 7,000] with the aqueous solution of potassium hydroxide. Twenty parts of this Polymer C, 10 parts of a pigment (C.I. Pigment Blue 15:3) and 70 parts of ion-exchanged water were mixed and dispersed for 3 hours by means of a batch type vertical sand mill. Thereafter, coarse particles were removed by a centrifugal treatment, and the thus treated dispersion was filtered under pressure through a microfilter (product of Fuji Photo Film Co., Ltd.) having a pore size of 3.0 μm to obtain Cyan Pigment Dispersion having a pigment concentration of 10%.

Preparation of Ink

The pigment dispersions obtained above were used to prepare respective inks having their corresponding compositions shown in Tables 1-1 and 1-2. Specifically, after their corresponding components shown in Tables 1-1 and 1-2 were mixed and sufficiently stirred, the resultant respective mixtures were filtered under pressure through a microfilter (product of Fuji Photo Film Co., Ltd.) having a pore size of 3.0 μm, thereby preparing the inks. The ratio of the amount of the polymer/the amount of a surfactant in each of the inks is also shown in Tables 1-1 and 1-2. Surfactants used are described in Table 2.

TABLE 1-1

Ink compositions of Examples (Unit: parts)

| | Example | | | | | | |
|---|---|---|---|---|---|---|---|
| | 1 | 2 | 3 | 4 | 5 | 6 | 7 |
| Black Pigment Dispersion 1 | 30 | 30 | | 40 | | 30 | 20 |
| Black Pigment Dispersion 2 | | | | | 30 | | |
| Cyan Pigment Dispersion | | | 30 | | | | |
| Surfactant 1 | 2 | | 1 | 0.2 | 2 | 0.08 | 10 |
| Surfactant 2 | | | | | | | |
| Surfactant 3 | | | | | | | |
| Surfactant 4 | | 2 | | | | | |
| Surfactant 5 | | | | | | | |
| Glycerol | 10 | 10 | 10 | 10 | 10 | 10 | 10 |
| Water | Bal | Bal | Bal | Bal | Bal | Bal | Bal |
| Polymer/Surfactant | 0.6 | 0.6 | 1.2 | 8 | 0.6 | 15 | 0.08 |

Table 1-2: Ink Compositions of Comparative Examples (Unit: parts)

| | Comparative Example | | |
|---|---|---|---|
| | 1 | 2 | 3 |
| Black Pigment Dispersion 1 | 30 | 30 | 30 |
| Black Pigment Dispersion 2 | | | |
| Cyan Pigment Dispersion | | | |
| Surfactant 1 | | | |
| Surfactant 2 | 2 | | |
| Surfactant 3 | | 2 | |
| Surfactant 4 | | | |
| Surfactant 5 | | | 2 |
| Glycerol | 10 | 10 | 10 |
| Water | Bal | Bal | Bal |
| Polymer/Surfactant | 0.6 | 0.6 | 0.6 |

TABLE 2

Surfactants used in inks

| | Trade name | Cloud point of 1% aqueous solution (° C.) | PO group | Structure |
|---|---|---|---|---|
| Surfactant 1 | FINESURF 7085 (product of AOKI OIL INDUSTRIAL CO., LTD.) | 23.5 | Present | Type 1 |
| Surfactant 2 | FINESURF 560 (product of AOKI OIL INDUSTRIAL CO., LTD.) | 60 | Present | Type 1 |
| Surfactant 3 | SOFTANOL 50 (product of NIPPON SHOKUBAI CO., LTD.) | <0 | Absent | Type 1 |
| Surfactant 4 | SOFTANOL EP7045 (product of NIPPON SHOKUBAI CO., LTD.) | 30 | Present | Type 1 |
| Surfactant 5 | L-101 (product of ADEKA CORPORATION) | 15 | Present | Type 2 |

Structure in Table 2 indicates that the respective surfactants are classified into the following respective types. Incidentally, EO is an ethyleneoxy group, PO is a propyleneoxy group, and R is an alkyl group.

Type 1: Alcohol ether surfactant
Structural formula: $R\text{-}O\text{-}(EO)_n(PO)_mH$
(In the formula, R is an alkyl group having 7 to 24 carbon atoms, n is an integer of 20 to 50, and m is an integer of 1 to 20)

Type 2: EOPO block surfactant
Structure: $HO\text{-}(EO)_1(PO)_m(EO)_nH$.

Evaluation of Transfer Leftover

A modified machine of PIXUS Pro9500 (manufactured by Canon Inc.) was used to evaluate whether transfer leftover occurred or not when an image was formed with each of the inks of Examples and Comparative Examples. Specifically, a reaction liquid and each ink were set at positions of a photomagenta ink and a cyan ink, respectively, and a square solid image of 20 mm by 20 mm was formed with each ink in such a manner that the reaction liquid is previously applied to an intermediate transfer member. An applied reaction liquid quantity on a region to which the ink is applied was controlled to 1/5 of the ink. As the intermediate transfer member, was used that the surface member of which is silicone rubber. After the formation of the image, the image was dried by a handy dryer and transferred to coated paper (AURORA COAT, product of Nippon Paper Industries Co., Ltd.). The transfer leftover on the intermediate transfer member after the transfer was visually evaluated. The results thereof are shown in Table 3. The composition of the reaction liquid used in the formation of the image is described below. The pH of the reaction liquid was controlled to 4.

Composition of Reaction Liquid:

| | |
|---|---|
| Glutaric acid | 10 parts |
| Glycerol | 10 parts |
| Potassium hydroxide | 1.2 parts |
| Acetylenol E100 (product of Kawaken Fine Chemicals Co., Ltd.) | 1 part |
| Water | Balance. |

TABLE 3

| | Evaluation results |
|---|---|
| | Transfer leftover |
| Example 1 | AA |
| Example 2 | AA |
| Example 3 | AA |
| Example 4 | AA |
| Example 5 | AA |
| Example 6 | A |
| Example 7 | AA |
| Comparative Example 1 | C |
| Comparative Example 2 | C |
| Comparative Example 3 | C |

AA: Transfer leftover is not observed
A: Transfer leftover is somewhat observed
C: Transfer leftover is markedly observed Ejection Stability Occurrence of stripy irregularity in the image formed on the intermediate transfer member was visually confirmed to evaluate ejection stability. As a result, the images formed with the inks of Examples 1 to 6 were good images free of stripy irregularity, and so it is inferred that the inks are stably ejected. On the other hand, in the image formed with the ink of Example 7, stripy irregularity somewhat occurred at a solid portion thereof, and so it is inferred that this ink has a somewhat poorer ejection stability compared with the inks of Examples 1 to 6.

As apparent from the above results, according to the present invention, there can be provided a transfer ink jet recording aqueous ink, which is excellent in ejection stability and does not cause transfer leftover even when the ink is used as a pigment ink containing a polymer having a hydroxyl group in at least a part thereof as a dispersant in a recording method of a transfer system.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-102989, filed Apr. 28, 2010, which is hereby incorporated by reference herein in its entirety.

What is claimed is:

1. An ink set comprising an aqueous ink and reaction liquid for use in a transfer ink jet recording method comprising a reaction liquid applying step of applying to an intermediate transfer member the reaction liquid which forms an increased viscosity ink image by coming into contact with a coloring material in the aqueous ink, an intermediate image forming step of applying the aqueous ink to the intermediate transfer member to which the reaction liquid has been applied by means of an ink jet device to form an intermediate image, and a transfer step of bringing a printing object into contact under pressure with the intermediate transfer member on which the intermediate image has been formed to transfer the intermediate image to the printing object, the aqueous ink containing a coloring material, a nonionic surfactant, and an aqueous medium, wherein the coloring material is a polymer dispersion pigment dispersed in the aqueous medium with a polymer having a hydroxyl group in at least a part of its structure as a dispersant, and the nonionic surfactant is an alcohol ether surfactant a 1% aqueous solution of which has a cloud point of 33° C. or less and which has an alkyl group having 4 to 30 carbon atoms and a propyleneoxy group in its structure.

2. The ink set according to claim 1, wherein the reaction liquid contains an organic acid.

3. The ink set according to claim 1, wherein a mass ratio (polymer/surfactant) of the content of the polymer having a hydroxyl group in at least a part thereof in the ink to the content of the surfactant in the ink is 0.1 or more and less than 10.

4. The ink set according to claim 1, wherein the polymer having a hydroxyl group in at least a part thereof has an acid value of 50 mg KOH/g or more and less than 350 mg KOH/g.

* * * * *